(No Model.)
2 Sheets—Sheet 1.
E. F. KNIGHT.
BAND CUTTER AND FEEDER FOR THRASHING MACHINES.
No. 305,394. Patented Sept. 16, 1884.
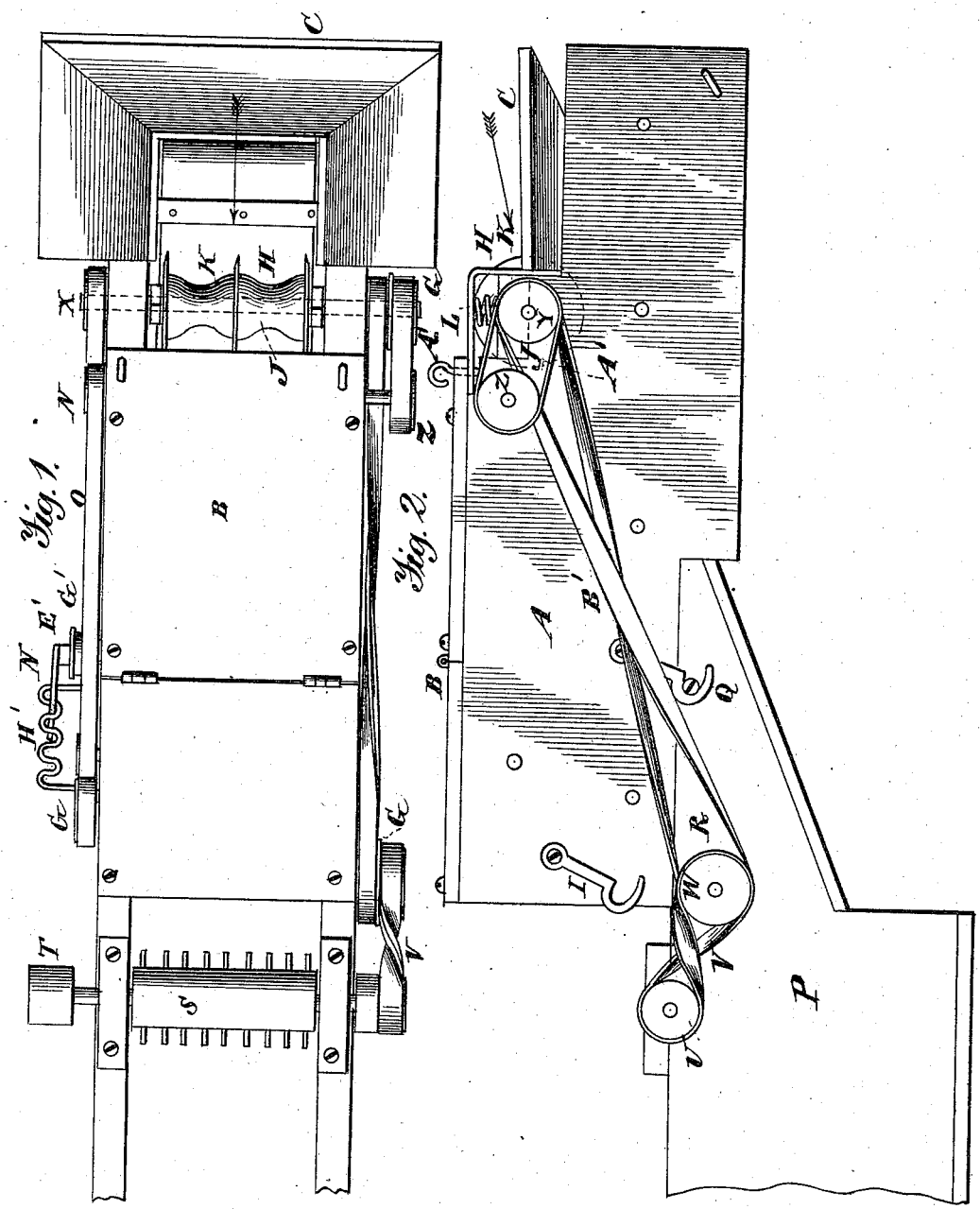

(No Model.) 2 Sheets—Sheet 2.
E. F. KNIGHT.
BAND CUTTER AND FEEDER FOR THRASHING MACHINES.
No. 305,394. Patented Sept. 16, 1884.
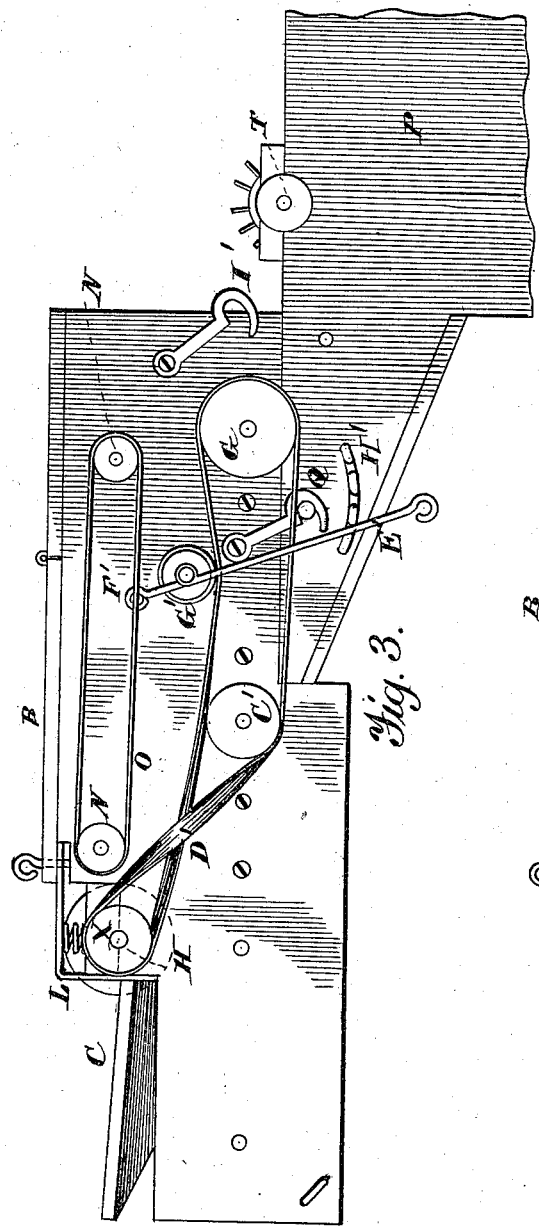
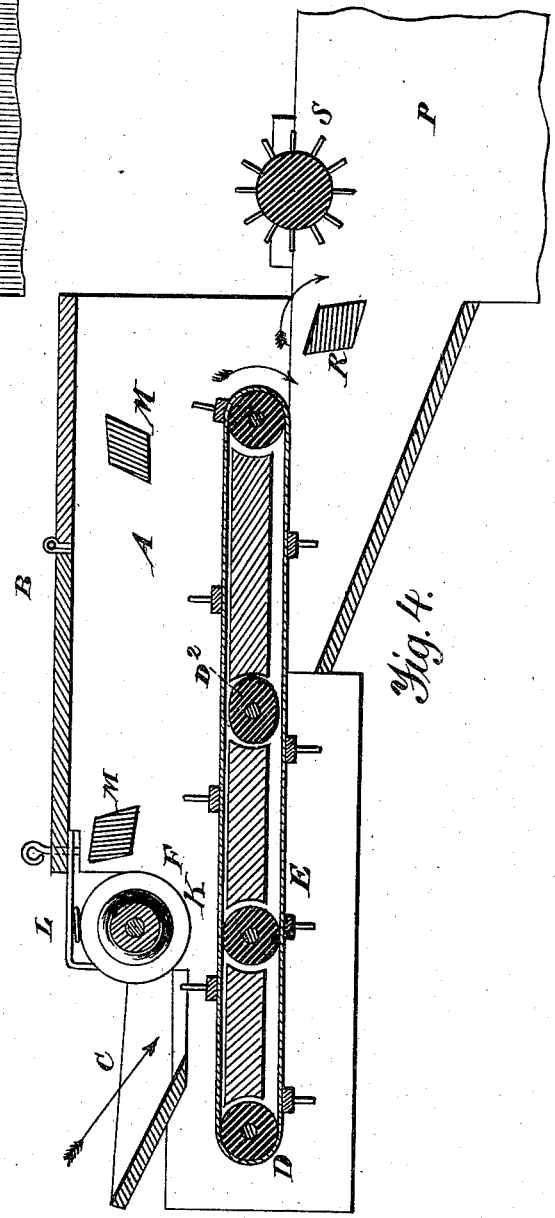
Witnesses.
A. Ruppert.
Alfred T. Gage.
Inventor:
Edwin F. Knight
by
England & Blanchard
Attys.

ized in the casing, in the bottom thereof, are
UNITED STATES PATENT OFFICE.

EDWIN F. KNIGHT, OF OLNEY, ILLINOIS.

BAND-CUTTER AND FEEDER FOR THRASHING-MACHINES.

SPECIFICATION forming part of Letters Patent No. 305,394, dated September 16, 1884.

Application filed April 29, 1884. (No model.)

*To all whom it may concern:*

Be it known that I, EDWIN F. KNIGHT, a citizen of the United States, residing at Olney, in the county of Richland and State of Illinois, have invented certain new and useful Improvements in Band-Cutters and Feeders for Thrashing-Machines, of which the following is a specification, reference being had therein to the accompanying drawings.

My invention relates to an improvement in band-cutters and straw-carriers for thrashing-machines; and it consists in the combination and construction of devices that will be more fully set forth hereinafter, and particularly pointed out in the claim.

In the accompanying drawings, Figure 1 is a top plan view of a machine embodying my invention. Fig. 2 is a side elevation. Fig. 3 is a side elevation taken from the opposite side from that shown in Fig. 2. Fig. 4 is a vertical longitudinal section.

A represents a rectangular box or casing, which is provided with the hinged covers B, and with a hopper, C, at one end. Journaled in the casing, in the bottom thereof, are a number of rollers, D, which are arranged in a horizontal line. The roller $D^2$ is formed oblong in cross-section to give a vibratory motion to the endless apron passing over it to keep the straw loose. Over and around these rollers passes an endless belt, E, which is provided with cross-slats F. On one end of the shaft of the outer one of these rollers is affixed the double pulley G, as shown in Figs. 1 and 2.

H represents a shaft which is journaled in sliding blocks I, that are secured in the casing near the hopper, and on this shaft is secured a feeding-roll, J, which is made in sections, and a series of circular cutting-disks, K, which are secured at equal distances apart. Springs L bear upon the upper sides of the sliding blocks I and depress the roll J to its normal position, as shown in Fig. 4, while allowing a slight upward movement of said roll. M represents a series of agitators, which are preferably diamond-shaped in cross-section, and which have their shafts journaled in the upper side of the casing. Pulleys N are secured on the outer ends of these shafts, and are connected by the belt O.

To the lower outer end of the casing A is secured an extension, P, by means of suitable hooks or other fastening devices, Q. In this extension is journaled an agitator, R, which is similar to the agitators M, and which is located at a suitable distance below the outer end of the conveyer E, as shown in Fig. 4. A spiked roller, S, is journaled in the upper side of the extension at a suitable distance from the agitator. On one end of the shaft of this roller is affixed a drive-pulley, T, and on its opposite end is affixed a pulley, U. A crossed belt, V, connects the pulleys U and N with a pulley, W, which is affixed to the outer end of the agitator R.

The shaft H is provided with pulleys X and Y on its opposite extremities. A pulley, Z, is affixed on the end of the shaft of the inner agitator, M, on a line with the pulley Y, and is connected thereto by the belt A'. A cross-belt, B', connects the pulleys W and Y. The shaft of one of the rollers D has a pulley, C', secured on its end in a line with the pulley G. A cross-belt, D', connects the pulleys X, C', and G, as shown at Fig. 3. E' represents a lever, which is pivoted at F', and which is provided with a friction-roller, G'. This lever, with its roller, forms a tightener for the belt D', and by moving the lever E' the conveyer E can be stopped or started. A rack, H', secures the lower end of the lever in any desired position.

I' represents fastening devices for securing the outer end of the casing to a thrashing-machine, which is not shown here, as it forms no part of the invention.

The operation of my invention is as follows: The bundles of grain are fed through the hopper C upon the conveyer E, which carries them forward under the rotating cutting-disks K, which sever the bands. The agitator M serves to distribute the straw evenly upon the carrier-belt and loosen and beat out the chaff, which falls through the space left between the carrier and the agitator R. This agitator feeds the straw to the spiked roller S, which conveys it to the thrashing mechanism.

By providing mechanism for admitting of vertical play of the cutting-roller J bundles of varying sizes can be successfully operated upon.

Having thus described my invention, I claim—

The combination of the casing with the roller J, having cutting-disks, bearing-blocks that slide in vertical ways, and springs for bearing upon said blocks, hopper C, conveyer E, oblong roller D², for agitating said conveyer, agitators M and R, and suitable operating connecting mechanism, substantially as described.

In testimony whereof I affix my signature in presence of two witnesses.

EDWIN F. KNIGHT.

Witnesses:
JOSEPH A. ENGLE,
DANIEL GLATHART.